United States Patent [19]
Kim et al.

[11] Patent Number: 5,748,887
[45] Date of Patent: May 5, 1998

[54] INTER-PROCESSOR ASYNCHRONOUS SERIAL COMMUNICATION TRANSMISSION/RECEPTION APPARATUS USING EACH OTHER'S MEMORIES

[75] Inventors: Young Goo Kim, Kyoungki-do; Jae Kon Kim, Seoul, both of Rep. of Korea

[73] Assignee: Hyundai Electronics Industries Co., Ltd., Kyoungki-Do, China

[21] Appl. No.: 634,020

[22] Filed: Apr. 17, 1996

[30] Foreign Application Priority Data

Apr. 18, 1995 [KR] Rep. of Korea ............... 95-9100

[51] Int. Cl.$^6$ ....................................... G06F 11/34
[52] U.S. Cl. ........................... 395/185.05; 355/891
[58] Field of Search ................. 371/47.1, 48, 49.1, 371/49.2; 364/270.5, 270.6; 395/200.31, 200.34, 821, 882, 885, 891, 185.01, 185.02, 185.04, 185.05, 185.03

[56] References Cited

U.S. PATENT DOCUMENTS 4,377,843 3/1983 Garringer et al. ............... 395/891
5,388,091 2/1995 Kagawa ....................... 340/825.05
5,392,289 2/1995 Varian ........................... 371/47.1

FOREIGN PATENT DOCUMENTS 2101859 1/1983 United Kingdom ............. G09G 1/16

Primary Examiner—Albert Decady
Attorney, Agent, or Firm—Fish & Richardson P.C.

[57] ABSTRACT

An inter-processor asynchronous serial communication transmission/reception apparatus using each other's memories. Some strips of line and a few drivers are used to transmit data far in an asynchronous serial communication manner employing dual port random access memories. Therefore, the present invention is economical and convenient to use. Further, one processor can use the dual port random access memory of the other processor like its own memory. This enables a parallel communication manner. Moreover, a wait signal is used when the data transmission and reception between processors are frequently performed. The use of wait signal requires no function for processing overhead resulting from an interrupt.

14 Claims, 4 Drawing Sheets

INTER-PROCESSOR ASYNCHRONOUS SERIAL COMMUNICATION TRANSMISSION/RECEPTION APPARATUS USING EACH OTHER'S MEMORIES

BACKGROUND OF THE INVENTION

1. Field of the Invention

The present invention relates in general to an inter-processor asynchronous serial communication transmission/reception apparatus using each other's memories, and more particularly to an inter-processor asynchronous serial communication transmission/reception apparatus using each other's memories in which each other's memories are used in a wait manner.

2. Description of the Prior Art

Generally data transmission and reception between processors are performed in a serial or parallel communication manner. The serial communication manner is desirable to transmit data far with some strips of line, but has the disadvantage that it is limited in use due to the limitation in transmission rate. The parallel communication manner is higher in transmission rate than the serial communication manner and convenient to use. However, the parallel communication manner is disadvantageous in that it requires many strips of line. Also the parallel communication manner has the disadvantage that many drivers are required to transmit data far.

On the other hand, inter-processor asynchronous serial communication transmission/reception apparatus using each other's memories have been proposed. Such a conventional inter-processor asynchronous serial communication transmission/reception apparatus employs an interrupt signal. This conventional inter-processor asynchronous serial communication transmission/reception apparatus employing the interrupt signal requires a function for processing overhead resulting from an interrupt when the data transmission and reception between processors are frequently performed. Such a overhead processing function results in a reduction in performance. Another conventional technique using the asynchronous serial communication manner is shown in U.S. Pat. No. 5,388,091. The '091 patent is mainly applied to test equipment for checking characteristics of electronic control devices. However, the '091 patent does not relate to the inter-processor asynchronous serial communication technique using each other's memories.

SUMMARY OF THE INVENTION

Therefore, the present invention has been made in view of the above problems, and it is an object of the present invention to provide an inter-processor asynchronous serial communication transmission/reception apparatus using each other's memories, in which one processor reads and writes data from/into a memory of the other processor in a parallel communication manner, and some strips of line and a few drivers are used to transmit data far in a serial communication manner.

In accordance with the present invention, the above and other objects can be accomplished by a provision of an inter-processor asynchronous serial communication transmission/reception apparatus using each other's memories, comprising mode, address and transmission data registers for selectively receiving a chip selection signal, a read signal and a write signal from a first processor; a parallel/serial register for converting parallel data from the mode register, address register and transmission data register into serial data in response to an external clock signal; a line driver for receiving the serial data from the parallel/serial register and transmitting the received serial data to a second processor in response to the external clock signal; a parity generator for generating a parity bit in response to the parallel data from the mode register, address register and transmission data register and supplying the generated parity bit to the parallel/serial register; a line receiver for receiving serial data from the second processor and transmitting the received serial data to the first processor; a serial/parallel register for converting the serial data from the line receiver into parallel data in response to the external clock signal; a wait register for generating a time delay signal and a reset signal in response to a data signal from the first processor and the parallel data from the serial/parallel register and supplying the generated reset signal to the first processor; a first counter for performing a counting operation in response to an output signal from the wait register, an output signal from the mode register, the external clock signal and a central processing unit clock signal from the first processor; a parity check register for checking a parity bit of the parallel data from the serial/parallel register; an error pattern detector for detecting an error pattern of the serial data from the line receiver in response to the external clock signal; a second counter for performing a counting operation in response to an output signal from the line receiver and the external clock signal; a first logic gate for generating a wait signal in response to output signals from the first and second counters and supplying the generated wait signal to the first processor; and a second logic gate for generating an error signal in response to an output signal from the parity check register and an output signal from the error pattern detector and supplying the generated error signal to the first processor.

BRIEF DESCRIPTION OF THE DRAWINGS

The above and other objects, features and advantages of the present invention will be more clearly understood from the following detailed description taken in conjunction with the accompanying drawings, in which:

FIG. 3 shows formats of transmission/reception data between a second processor in FIG. 1 and the inter-processor asynchronous serial communication transmission/reception apparatus in FIG. 1, wherein:

FIG. 3A is a view illustrating a format of a line driver signal in a write mode;

FIG. 3B is a view illustrating a format of the line driver signal in a read mode;

FIG. 3C is a view illustrating a format of the line driver signal in an additional mode;

FIG. 3D is a view illustrating a format of a line receiver signal under a normal condition; and FIG. 3E is a view illustrating a format of the line receiver signal when a parity error is present in the line driver signal;

DETAILED DESCRIPTION OF THE PREFERRED EMBODIMENTS

Figure 1:
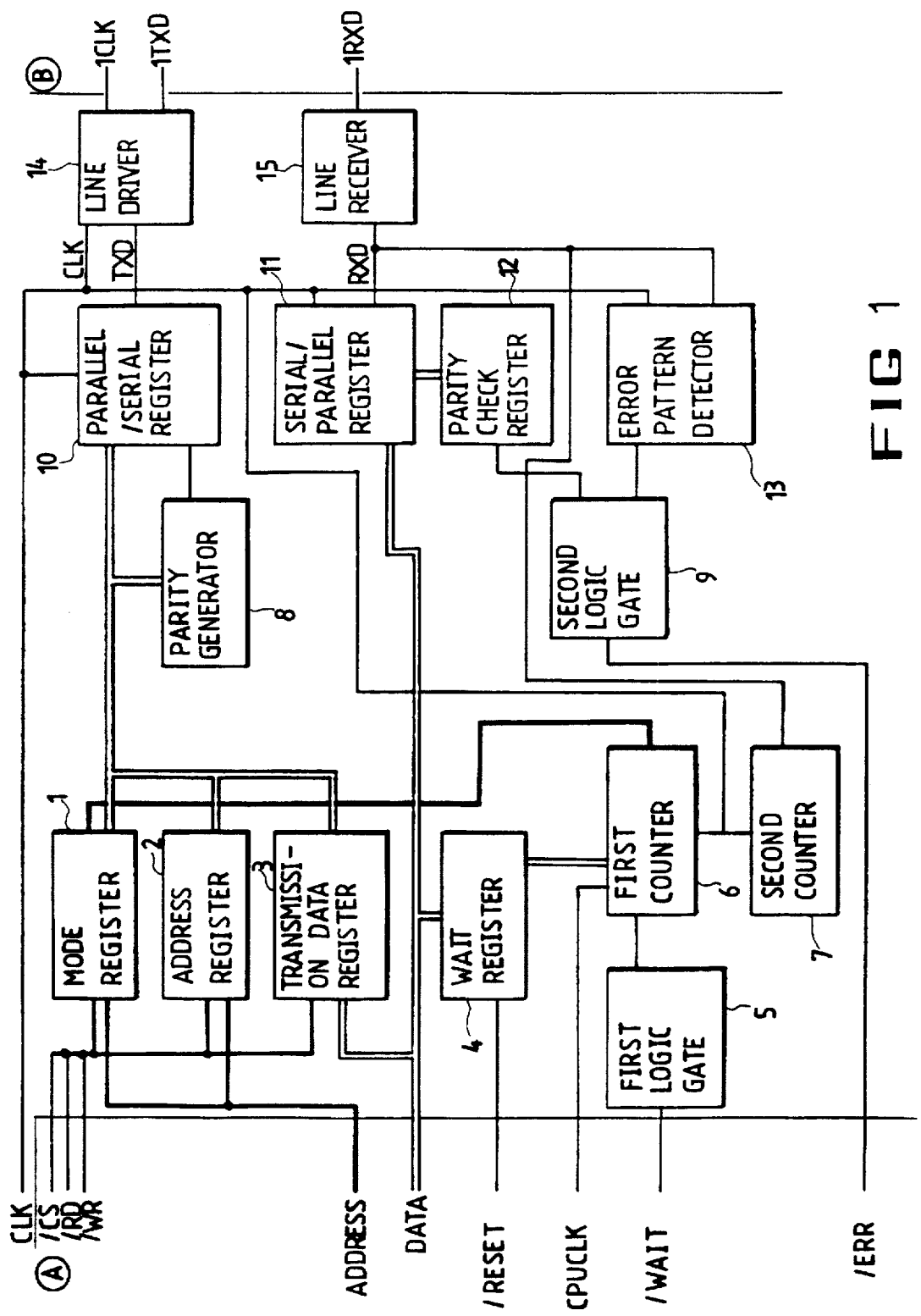
FIG. 1 is a block diagram of an inter-processor asynchronous serial communication transmission/reception apparatus using each other's memories in accordance with an embodiment of the present invention.

Referring to FIG. 1, there is shown a block diagram of an inter-processor asynchronous serial communication transmission/reception apparatus using each other's memories in accordance with an embodiment of the present invention. In this drawing, the reference numeral 1 designates a mode register; the reference numeral 2 designates an address register, the reference numeral 3 designates a transmission data register, the reference numeral 4 designates a wait register, the reference numeral 5 designates a first logic gate, the reference numeral 6 designates a first counter, the reference numeral 7 designates a second counter, the reference numeral 8 designates a parity generator, the reference numeral 9 designates a second logic gate, the reference numeral 10 designates a parallel/serial register, the reference numeral 11 designates a serial/parallel register, the reference numeral 12 designates a parity check register, the reference numeral 13 designates an error pattern detector, the reference numeral 14 designates a line driver and the reference numeral 15 designates a line receiver.

The operation of the inter-processor asynchronous serial communication transmission/reception apparatus with the construction in FIG. 1 in accordance with the embodiment of the present invention will hereinafter be described in detail.

A first processor A selectively generates a chip selection signal /CS, a read signal /RD, a write signal /WR, an address signal ADDRESS, a data signal DATA and a central processing unit clock signal CPUCLK and selectively receives a reset signal /RESET, a wait signal /WAIT and an error signal /ERR to communicate with a second processor B.

The mode register 1, the address register 2 and the transmission data register 3 selectively receive the chip selection signal /CS, the read signal /RD and the write signal /WR from the first processor A. The parallel/serial register 10 converts parallel data from the mode register 1, address register 2 and transmission data register 3 into serial data in response to an external clock signal CLK. The line driver 14 receives the serial data from the parallel/serial register 10 and transmits the received serial data to the second processor B in response to the external clock signal CLK. The parity generator 8 generates a parity bit in response to the parallel data from the mode register 1, address register 2 and transmission data register 3 and supplies the generated parity bit to the parallel/serial register 10.

The line receiver 15 receives serial data from the second processor B and transmits the received serial data to the first processor A. The serial/parallel register 11 converts the serial data from the line receiver 15 into parallel data in response to the external clock signal CLK. The wait register 4 generates a time delay signal and the reset signal /RESET in response to the data signal DATA from the first processor A and the parallel data from the serial/parallel register 11 and supplies the generated reset signal /RESET to the first processor A. The first counter 6 performs a counting operation in response to an output signal from the wait register 4, an output signal from the mode register 1, the external clock signal CLK and the central processing unit clock signal CPUCLK from the first processor A.

The parity check register 12 checks a parity bit of the parallel data from the serial/parallel register 11. The error pattern detector 13 detects an error pattern of the serial data from the line receiver 15 in response to the external clock signal CLK. The second counter 7 performs a counting operation in response to an output signal from the line receiver 15 and the external clock signal CLK. The first logic gate 5 generates the wait signal /WAIT in response to output signals from the first and second counters 6 and 7 and supplies the generated wait signal /WAIT to the first processor A. The second logic gate 9 generates the error signal /ERR in response to an output signal from the parity check register 12 and an output signal from the error pattern detector 13 and supplies the generated error signal /ERR to the first processor A.

Figure 2:
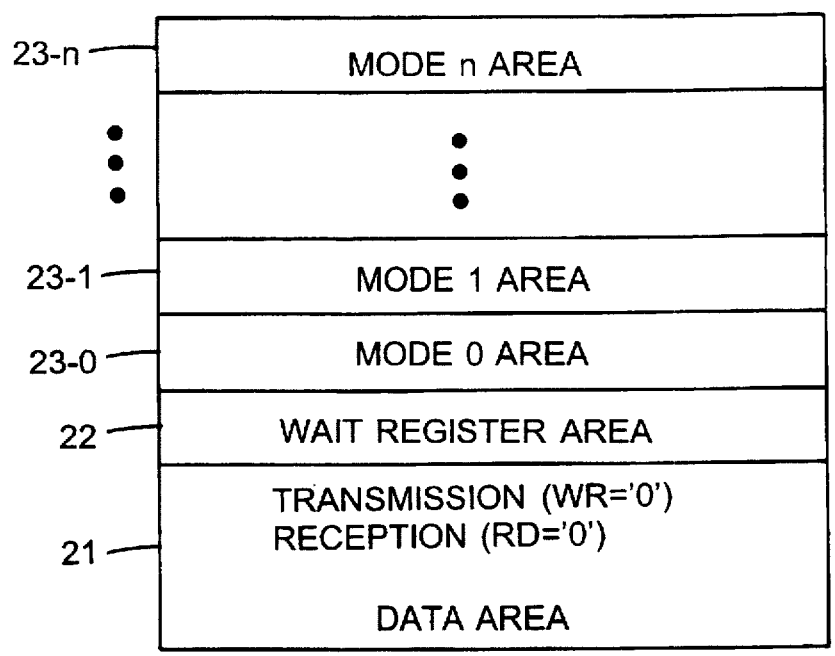
FIG. 2 is a view illustrating a mode setting address map in accordance with the embodiment of the present invention.

FIG. 2 is a view illustrating a mode setting address map in accordance with the embodiment of the present invention. In this drawing, a mode address region is defined according to the address signal ADDRESS, read signal /RD and write signal /WR to the mode register 1.

As shown in FIG. 2, the mode address region includes a transmission (/WR=0)/reception (/RD=0) data area 21, a wait register area 22 and mode 0 to n areas 23-0 to 23-n.

Figure 3:
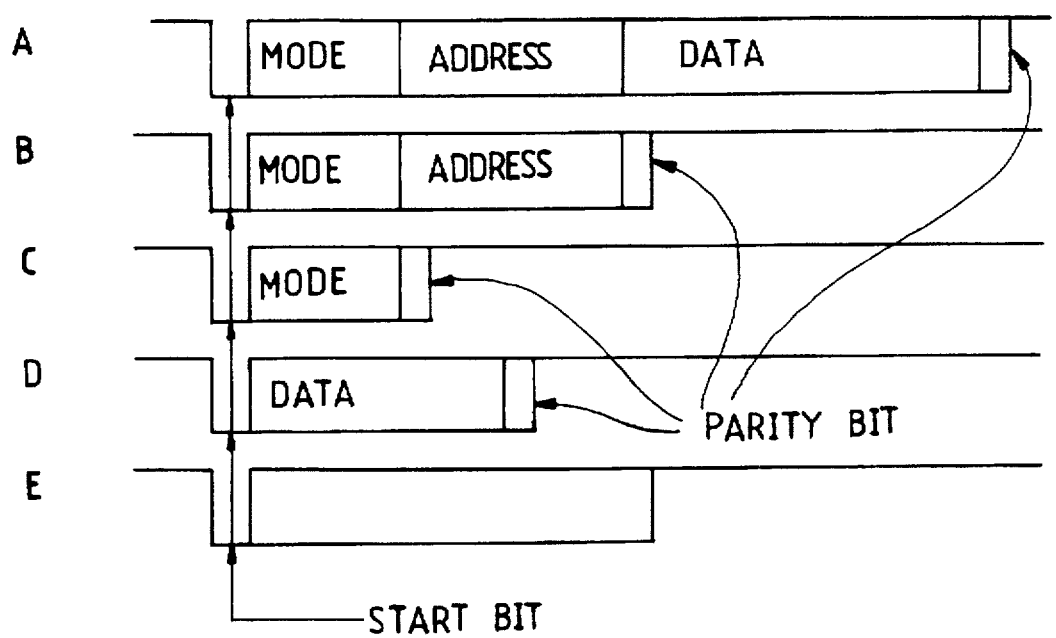

FIG. 3 shows formats of transmission/reception data between the second processor B and the inter-processor asynchronous serial communication transmission/reception apparatus of the present invention. Here, FIG. 3A is a view illustrating a format of a line driver signal TXD in a write mode, FIG. 3B is a view illustrating a format of the line driver signal TXD in a read mode, FIG. 3C is a view illustrating a format of the line driver signal TXD in a additional mode, FIG. 3D is a view illustrating a format of a line receiver signal RXD under a normal condition and FIG. 3E is a view illustrating a format of the line receiver signal RXD when a parity error is present in the line driver signal TXD.

As shown in FIGS. 3A to 3E, a start bit is initially applied to each signal. In the write mode, the mode, address, data and parity bit appear sequentially in the line driver signal TXD as shown in FIG. 3A. In the read mode, the mode, address and parity bit appear sequentially in the line driver signal TXD as shown in FIG. 3B. In the additional mode, the mode and parity bit appear sequentially in the line driver signal TXD as shown in FIG. 3C. Under the normal condition, the data and parity bit appear sequentially in the line receiver signal RXD as shown in FIG. 3D. In the case where a parity error is present in the line driver signal TXD, an error pattern appears in the line receiver signal RXD as shown in FIG. 3E.

Figure 4:
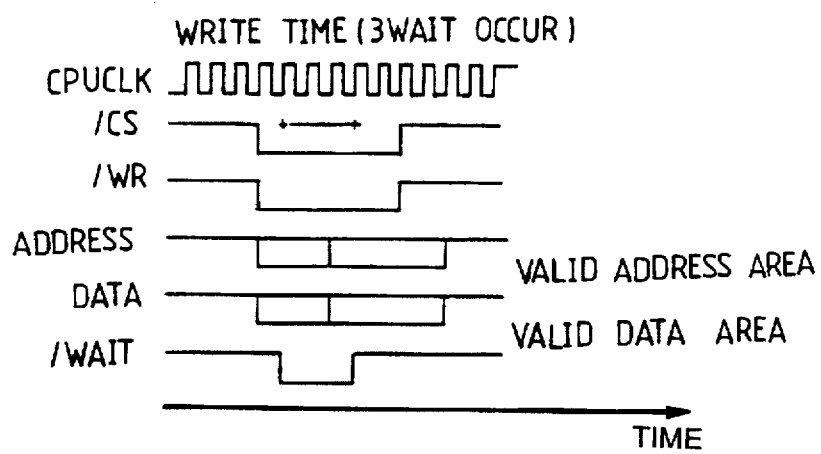
FIG. 4 is a timing diagram of transmission/reception signals between a first processor in FIG. 1 and the inter-processor asynchronous serial communication transmission/reception apparatus in FIG. 1 when the first processor writes data into a memory of the second processor in FIG. 1.

FIG. 4 is a timing diagram of transmission/reception signals between the first processor A and the inter-processor asynchronous serial communication transmission/reception apparatus of the present invention when the first processor A writes data into a memory of the second processor B. This drawing shows level variations of the chip selection signal /CS, write signal /WR, address signal ADDRESS, data signal DATA and wait signal /WAIT with a level variation of the central processing unit clock signal CPUCLK. As shown in this drawing, the address signal ADDRESS and the data signal DATA have rectangular forms at their central lower portions, which indicate a valid address area and a valid data area, respectively.

Figure 5:
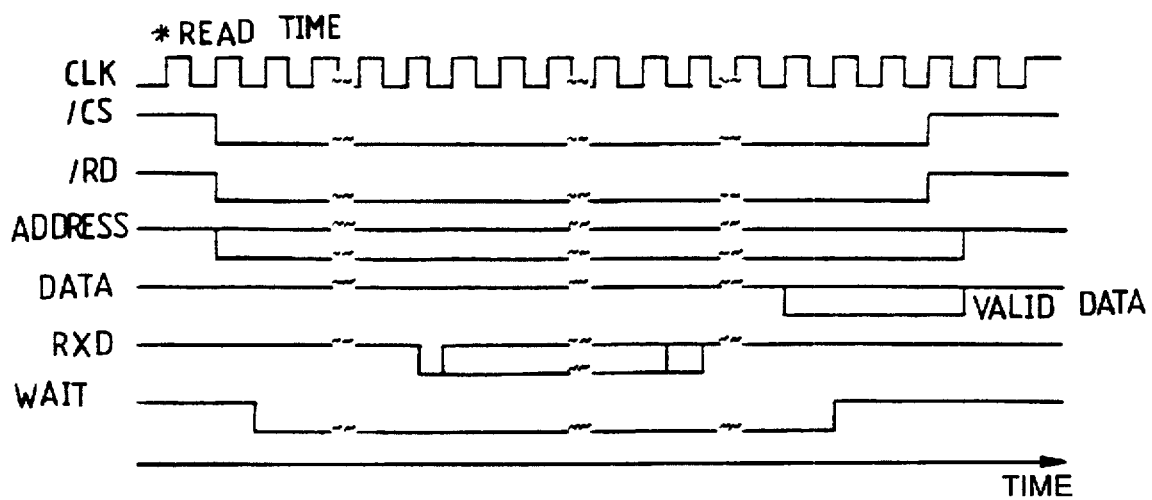
FIG. 5 is a timing diagram of transmission/reception signals between the first and second processors in FIG. 1 when the first processor reads data from the memory of the second processor.

FIG. 5 is a timing diagram of transmission/reception signals between the first and second processors A and B in FIG. 1 when the first processor A reads data from the memory of the second processor B. This drawing shows level variations of the chip selection signal /CS, read signal /RD, address signal ADDRESS, data signal DATA, line receiver signal RXD and wait signal /WAIT with a level variation of the external clock signal CLK.

In the case where the first processor A is to write data into the memory of the second processor B, the chip selection signal /CS and write signal /WR from the first processor A become both low in logic as shown in the timing diagram of FIG. 4. A write mode value is applied to the mode register 1 when the address signal ADDRESS from the first processor A is present in the transmission/reception data area 21 in FIG. 2. At the same time, an address value on an address line is applied to the address register 2. Also, a data value on a data line is applied to the transmission data register 3. If the speed of a central processing unit in the first processor A is higher than the access timing of the present apparatus, the number of central processing unit clocks CPUCLK to be waited is set in the wait register area 22 and then applied to the wait register 4. The wait register 4 has a reset value which is its maximum value.

As a result, the address value on the address line and the data value on the data line are delayed by the reset value of the wait register 4 and then applied to the address register 2 and the transmission data register 3, respectively. The parallel/serial register 10 sequentially converts the parallel data from the mode register 1, address register 2 and transmission data register 3 into the serial data TXD as shown in FIG. 3A in response to the external clock signal CLK. The parallel data from the mode register 1, address register 2 and transmission data register 3 are also applied to the parity generator 8, which provides the parity bit to a parity input terminal of the parallel/serial register 10.

The line driver 14 receives the serial data from the parallel/serial register 10 and transmits the received serial data to the second processor B in response to the external clock signal CLK. The line driver 14 is used to transmit the data far.

On the other hand, in the case where the first processor A is to read data from the memory of the second processor B, the chip selection signal /CS and read signal /WR from the first processor A become both low in logic as shown in the timing diagram of FIG. 5. A read mode value is applied to the mode register 1 when the address signal ADDRESS from the first processor A is present in the transmission/reception data area 21 in FIG. 2. At the same time, an address value on the address line is applied to the address register 2. Also, a data value on the data line is applied to the transmission data register 3.

The wait signal /WAIT from the first logic gate 5 is initially low in logic regardless of the reset value of the wait register 4. The line receiver 15 receives the serial data RXD from the second processor B and transmits the received serial data RXD to the serial/parallel register 11. The serial/parallel register 11 converts the serial data RXD from the line receiver 15 into the parallel data which is then placed on the data line. At this time, when the serial data RXD from the line receiver 15 is under the normal condition as shown in FIG. 3D, the start bit thereof is applied to the second counter 7 which outputs a control signal to the first logic gate 5 at the moment that the serial/parallel conversion operation of the serial/parallel register 11 is completed. The control signal from the second counter 7 allows the wait signal /WAIT from the first logic gate 5 to go from low to high in logic.

At this time, the first processor A reads the data value placed on the data line.

The parallel data from the serial/parallel register 11 is also applied to the parity check register 12 which checks a parity bit thereof. When a parity error is present as a result of the checking, the parity check register 12 outputs a control signal to the second logic gate 9, thereby causing the error signal /ERR from the second logic gate 9 to become low in logic.

Also, when an error pattern is present in the serial data RXD from the line receiver 15, it is detected by the error pattern detector 13 which then provides a control signal to the second logic gate 9, thereby causing the error signal /ERR from the second logic gate 9 to become low in logic When any mode other than the read and write modes is to be used, the line driver 14 transmits the serial data TXD with the format as shown in FIG. 3C. Such a mode is similar to the write mode and has an address area which may be any one of the mode 0 to n areas 23-0 to 23-n in FIG. 2.

As apparent from the above description, according to the present invention, some strips of line and a few drivers are used to transmit data far in an asynchronous serial communication manner employing dual port random access memories. Therefore, the present invention is economical and convenient to use. Further, one processor can use the dual port random access memory of the other processor like its own memory. This enables a parallel communication manner. Moreover, the wait signal is used when the data transmission and reception between processors are frequently performed. The use of wait signal requires no function for processing overhead resulting from an interrupt.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An inter-processor asynchronous serial communication transmission/reception apparatus using each other's memories, comprising:

mode, address and transmission data registers for selectively receiving a chip selection signal, a read signal and a write signal from a first processor;

a parallel/serial register for converting parallel data from said mode register, address register and transmission data register into serial data in response to an external clock signal;

a line driver for receiving the serial data from said parallel/serial register and transmitting the received serial data to a second processor in response to the external clock signal;

a parity generator for generating a parity bit in response to the parallel data from said mode register, address register and transmission data register and supplying the generated parity bit to said parallel/serial register;

a line receiver for receiving serial data from said second processor and transmitting the received serial data to said first processor;

a serial/parallel register for converting the serial data from said line receiver into parallel data in response to the external clock signal;

a wait register for generating a time delay signal and a reset signal in response to a data signal from said first processor and the parallel data from said serial/parallel register and supplying the generated reset signal to said first processor;

a first counter for performing a counting operation in response to an output signal from said wait register, an output signal from said rode register, the external clock signal and a central processing unit clock signal from said first processor;

a parity check register for checking a parity bit of the parallel data from said serial/parallel register;

an error pattern detector for detecting an error pattern of the serial data from said line receiver in response to the external clock signal;

a second counter for performing a counting operation in response to an output signal from said line receiver and the external clock signal;

a first logic gate for generating a wait signal in response to output signals from said first and second counters and supplying the generated wait signal to said first processor; and a second logic gate for generating an error signal in response to an output signal from said parity check register and an output signal from said error pattern detector and supplying the generated error signal to said first processor.

2. An inter-processor asynchronous serial communication transmission/reception apparatus using each other's memories, as set forth in claim 1, wherein the chip selection signal and write signal from said first processor become both low in logic in the case where said first processor is to write data into a memory of said second processor.

3. An inter-processor asynchronous serial communication transmission/reception apparatus using each other's memories, as set forth in claim 2, wherein a write mode value is applied to said mode register, an address value on an address line is applied to said address register and a data value on a data line is applied to said transmission data register, when an address signal from said first processor is present in a transmission/reception data area.

4. An inter-processor asynchronous serial communication transmission/reception apparatus using each other's memories, as set forth in claim 3, wherein the number of central processing unit clocks to be waited is set in a wait register area and then applied to said wait register, if the speed of a central processing unit in said first processor is higher than an access timing.

5. An inter-processor asynchronous serial communication transmission/reception apparatus using each other's memories, as set forth in claim 4, wherein said wait register has a reset value which is its maximum value.

6. An inter-processor asynchronous serial communication transmission/reception apparatus using each other's memories, as set forth in claim 5, wherein the address value on said address line and the data value on said data line are delayed by the reset value of said wait register and then applied to said address register and said transmission data register, respectively.

7. An inter-processor asynchronous serial communication transmission/reception apparatus using each other's memories, as set forth in claim 6, wherein said parallel/serial register sequentially converts the parallel data from said mode register, address register and transmission data register into the serial data in response to the external clock signal and transmits the resultant serial data to said second processor through said line driver.

8. An inter-processor asynchronous serial communication transmission/reception apparatus using each other's memories, as set forth in claim 7, wherein said line driver is used to transmit data far.

9. An inter-processor asynchronous serial communication transmission/reception apparatus using each other's memories, as set forth in claim 1, wherein the chip selection signal and read signal from said first processor become both low in logic in the case where said first processor is to read data from a memory of said second processor.

10. An inter-processor asynchronous serial communication transmission/reception apparatus using each other's memories, as set forth in claim 9, wherein a read mode value is applied to said mode register, an address value on an address line is applied to said address register and a data value on a data line is applied to said transmission data register, when an address signal from said first processor is present in a transmission/reception data area.

11. An inter-processor asynchronous serial communication transmission/reception apparatus using each other's memories, as set forth in claim 10, wherein the wait signal from said first logic gate is initially low in logic regardless of a reset value of said wait register so that said line receiver can receive the serial data from said second processor and transmit the received serial data to said serial/parallel register.

12. An inter-processor asynchronous serial communication transmission/reception apparatus using each other's memories, as set forth in claim 11, wherein said serial/parallel register converts the serial data from said line receiver into the parallel data and places the resultant parallel data on said data line.

13. An inter-processor asynchronous serial communication transmission/reception apparatus using each other's memories, as set forth in claim 12, wherein the wait signal from said first logic gate goes from low to high in logic at the moment that the serial/parallel conversion operation of said serial/parallel register is completed; so that said first processor can read the parallel data placed on said data line.

14. An inter-processor asynchronous serial communication transmission/reception apparatus using each other's memories, as set forth in claim 13, wherein the error signal from said second logic gate becomes low in logic when said parity check register detects a parity error of the parallel data from said serial/parallel register or when said error pattern detector detects the error pattern of the serial data from said line receiver.

* * * * *